United States Patent [19]
Adamson et al.

[11] Patent Number: 4,969,325
[45] Date of Patent: Nov. 13, 1990

[54] TURBOFAN ENGINE HAVING A COUNTERROTATING PARTIALLY GEARED FAN DRIVE TURBINE

[75] Inventors: Arthur P. Adamson, Cincinnati; Robert A. Wall, Wyoming, both of Ohio

[73] Assignee: General Electric Company, Cincinnati, Ohio

[21] Appl. No.: 292,841

[22] Filed: Jan. 3, 1989

[51] Int. Cl.$^5$ ............................ F02C 3/67; F02C 7/36; F02K 3/72
[52] U.S. Cl. .................................... 60/226.1; 60/268; 60/39.162; 416/129
[58] Field of Search .................. 60/226.1, 39.162, 268; 416/129, 128, 171, 170 R; 415/65, 66, 68, 69; 74/DIG. 5

[56] References Cited
U.S. PATENT DOCUMENTS

| | | | |
|---|---|---|---|
| 3,673,802 | 7/1972 | Krebs et al. | 60/39.162 |
| 3,729,957 | 5/1973 | Petrie et al. | 60/39.162 |
| 4,005,575 | 2/1977 | Scott et al. | 60/268 |
| 4,159,624 | 7/1979 | Gruner | 60/39.162 |
| 4,251,987 | 2/1981 | Adamson . | |

FOREIGN PATENT DOCUMENTS 2129502  5/1984  United Kingdom ............ 60/39.162

Primary Examiner—Donald E. Stout
Attorney, Agent, or Firm—Jerome C. Squillaro

[57] ABSTRACT

A high bypass ratio turbofan engine having a fan section, a booster compressor disposed aft of the fan section relative to the flow of combustion gases through the engine, and a core section disposed aft of the booster compressor. A low pressure counterrotating turbine, disposed aft of the core section, is used for driving the fan section and the booster compressor. The counterrotating turbine includes at least one set of rotating turbine blades and at least one set of oppositely rotating counterrotating turbine blades. A twin spool shaft is provided for coupling the turbine blades to the booster compressor and for coupling the counterrotating turbine blades to the fan section. A reduction gear is disposed in the drive shaft for coupling the turbine blades to the fan section and for reducing the rotational speed of the turbine output power to match the rotational speed of the fan section thereby splitting the usable work of the turbine blades between the fan section and the booster.

5 Claims, 2 Drawing Sheets

TURBOFAN ENGINE HAVING A COUNTERROTATING PARTIALLY GEARED FAN DRIVE TURBINE

BACKGROUND OF THE INVENTION

1. Field of the Invention

The present invention relates to turbofan engines and, more specifically, to a high bypass ratio turbofan engine having a low pressure, partially geared counterrotating turbine for driving a booster compressor and a fan section.

2. Description of the Related Art

High bypass ratio turbofan engines, that is, turbofan engines having a bypass ratio of greater than about 8:1, tend to be heavy and expensive because the low speed, low pressure fan drive turbine, also referred to as the power turbine, and the low speed booster compressor each require numerous stages to accomplish the required amount of aerodynamic work as dictated by the thermodynamic working cycle. Also, the low speed booster compressor may be subject to serious icing problems where the speed of rotation is relatively low.

With reference to FIG. 1, prior art high bypass ratio turbofan engine 100 includes a low pressure or power turbine 102 which drives a booster compressor 104 disposed forward of a core section 106, and a fan section 108 disposed forward of booster compressor 104, via a drive shaft 110. Conventionally, in order to reduce the rotational speed of the power from the turbine section 102 to the required rotational speed of fan section 108, a reduction gear 112 is disposed in shaft 110 between booster compressor 104 and fan section 108. In this manner, booster compressor 104 is rotated at the same high rotational speed as turbine 102, and fan section 108 is rotated at a lower shaft speed via reduction gear 112 as required for good fan efficiency.

However, the engine arrangement as illustrated in FIG. 1 suffers from two significant drawbacks. First, reduction gear 112 must transmit the total fan drive horsepower from shaft 110 to fan section 108. Hence, reduction gear 112 is of necessity very heavy and, due to the inefficiency and heat loss inherent in reduction gears, requires a bulky, heavy and inefficient oil cooler. Secondly, because the maximum rotational speed available is limited by turbine blade stress criteria, the number of LP turbine stages must be relatively high in order to maintain efficient stage loading. A large number of LP turbine stages increases weight and rotor dynamics related design problems.

SUMMARY OF THE INVENTION

Accordingly, it is the object of the present invention to provide a high bypass ratio turbofan engine which utilizes gears to match and optimize fan, booster and power turbine rotational speeds: (a) without exceeding turbine speed limitations due to stress and (b) without transmitting all of the power turbine horsepower through the gearbox.

It is a further object of the present invention to provide a high bypass ratio turbofan engine which utilizes gears to match and optimize fan, booster and a counterrotating power turbine rotational speeds wherein the counterrotating power turbine blades and associated drums operate at different rotational speeds (RPM) as well as directions.

It is a further object of the present invention to provide a high bypass ratio turbofan engine wherein a smaller, lighter, and more efficient reduction gear may be utilized in the shaft between the fan and booster compressor.

It is a further object of the present invention to provide a high bypass ratio turbofan engine wherein the drive turbine for the booster compressor and fan section may be made smaller and lighter with fewer turbine stages while still meeting the work requirements to operate the booster compressor and fan section at optimum performance levels.

Additional objects and advantages of the invention will be set forth in the description which follows, and in part will be obvious from the description, or may be learned by practice of the invention. The objects and advantages of the invention may be realized and attained by the instrumentalities and combinations particularly pointed out in the appended claims.

To achieve the foregoing objects, and in accordance with the purposes of the invention as embodied and broadly described herein, a high bypass ratio turbofan engine is provided comprising a fan section, and a booster compressor disposed aft of the fan section relative to the flow of combustion gases through the engine. A core section is disposed aft of the booster compressor, and low pressure turbine means for driving the fan section and the booster compressor is disposed aft of the core. The low pressure turbine means comprises a counterrotating turbine having at least one set of axially spaced rows of rotating blades and one set of axially spaced rows of oppositely rotating or counterrotating turbine blades which turn at a different speed as well as a different direction. Outer and inner shaft means are provided for coupling the turbine blades to the booster compressor and for coupling the counterrotating turbine blades to the fan section, respectively. Reduction gear means are provided for coupling the higher speed turbine blades to the fan section, and for reducing the rotational speed of the outer shaft transmitting the output power of the low turbine in order to match the speed and direction of the fan section thereby splitting the usable work of the turbine blades between the fan section and the booster compressor.

Preferably the first set of turbine blades are mounted on an inner drum extending radially outward and the counterrotating turbine blades are mounted on an outer drum extending radially inward and the rows of rotating blades are interdigitated with the rows of counterrotating turbine blades. Preferably the inner drum is connected to the outer shaft means and the outer drum is connected to the inner shaft means although attachment may be in the opposite manner.

Preferably the first set of turbine blades are designed to turn at a higher rotational speed, ie greater RPM, than the counterrotating turbine blade with which they are interdigitated. This helps to optimize the engine's performance and minimize the size and weight of the gearbox and complexity of the engine.

Preferably, the outer and inner shaft means includes counterrotating outer and inner concentric shafts arranged as a twin spool with the inner shaft extending directly between the outer drum containing the counterrotating turbine blades and the fan section to directly drive the fan section.

It is further preferable that the reduction gear means includes a reduction gear having an input shaft connected to the outer shaft of the shaft means, and an output shaft connected to the fan section. The reduction gear also preferably includes means for reversing the direction of rotation of the outer shaft of the shaft means so that the direction of rotation and speed of the output shaft of the reduction gear matches the direction of rotation and speed of the inner shaft to thereby complement the work input necessary to rotate the fan section.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention. In the drawings.

DESCRIPTION OF THE PREFERRED EMBODIMENT

Reference will now be made in detail to the preferred embodiment of the invention as illustrated in the accompanying drawings.

Figure 2:
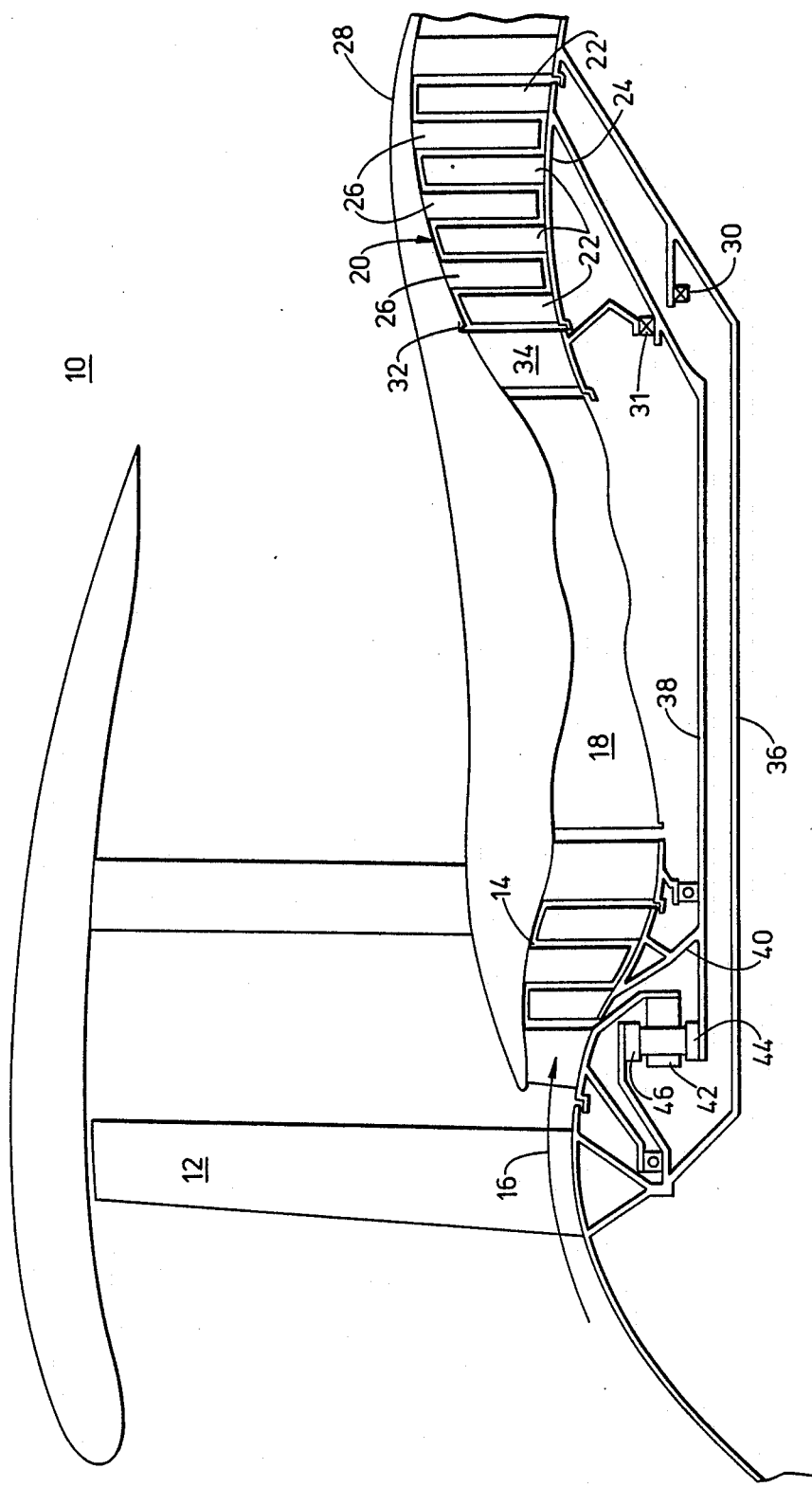
FIG. 2 is a schematic illustration of a high bypass ratio turbofan engine incorporating the teachings of the present invention.

High bypass ratio turbofan engine 10 of FIG. 2, which incorporates the teachings of the present invention, comprises a fan section 12 mounted for rotation in the engine and a booster compressor 14 disposed aft of fan section 12 relative to the flow of combustion gases through the engine as depicted by arrow 16. Engine 10 further includes a core section 18 disposed aft of booster compressor 14. Typically, core section 18 includes a high pressure compressor leading into combustion chambers which in turn exhaust hot combustion products through one or more high pressure turbines. These elements of core 18 are not illustrated herein since they are typical of core sections in turbofan engines as will be readily understood by one skilled in the art.

In accordance with the present invention, engine 10 further includes low pressure turbine means, disposed aft of the core, for driving the fan section and the booster compressor. As embodied herein, the low pressure turbine means includes a counterrotating turbine generally referred to as 20. Counterrotating turbine 20 includes at least one set of rotating turbine blades 22 extending from a inner drum 24 mounted for independent rotation on bearings within engine 10. Counterrotating turbine 20 further includes at least one set of oppositely rotating counterrotating turbine blades 26 extending from a rotatable casing or outer drum 28 and surrounding rotatable inner drum 24. In this embodiment the first rotating turbine blades 22 are designed and effective to operate at a higher rotational speed, RPM, than the counterrotating turbine blades 26. Rotatable seals 32 seal outer drum 28 relative to a frame 34 of engine 10.

In accordance with the present invention, engine 10 further includes outer shaft means for coupling the turbine blades to the booster compressor, and inner shaft means for directly coupling the counterrotating turbine blades to the fan section. As embodied herein, the inner and outer shaft means includes counterrotating inner and outer concentric shafts 36 and 38, respectively, arranged as a twin spool on respective bearings 30 and 31. Inner shaft 36 is connected directly to counterrotating turbine blades 26 and outer drum 28 at one end and fan section 12 at the other end to directly drive fan section 12 at the same rotational speed as counterrotating turbine blades 26 and outer drum 28.

Outer shaft 38 then couples first turbine blades 22 and inner drum 24 directly to booster compressor 14 via shaft connection 40 to drive booster compressor 14 at the same high rotational speed of first turbine blades 22.

In accordance with the invention, engine 10 further includes reduction gear means for coupling the turbine blades to the fan section, and for reducing the rotational speed thereof to match the rotational speed of the fan section thereby splitting the usable work of the turbine blades between the booster compressor and fan. As embodied herein, the reduction gear means comprises a reduction gear 42 having an input shaft 44 directly driven by outer shaft 38 of the shaft means which is connected to first turbine blades 22 and inner drum 24, and an outer output shaft 46 connected to fan section 12 to drive the fan. Reduction gear 42 acts to match the high rotational speed of first turbine blades 22 and the lower rotational speed of inner shaft 36 which is equal to the rotational speed of fan section 12.

Reduction gear 42 further includes means for reversing the direction of rotation of outer shaft 38 such that the direction of rotation of output shaft 46 matches the direction of rotation of inner shaft 36 to thereby complement and add to the shaft horsepower delivered to fan section 12. The operative configuration of reduction gear 42, including the means for reversing the direction of rotation of outer shaft 38, is not determinative or limiting of the scope of the present invention. Numerous conventional embodiments of reduction gear 42 which are operable with the present invention will be known by those skilled in the art. By way of example and not limitation, such reduction gears are disclosed in "Handbook of Practical Gear Design" by Darle W. Dudley, copyright 1984 by McGraw hill.

Figure 1:
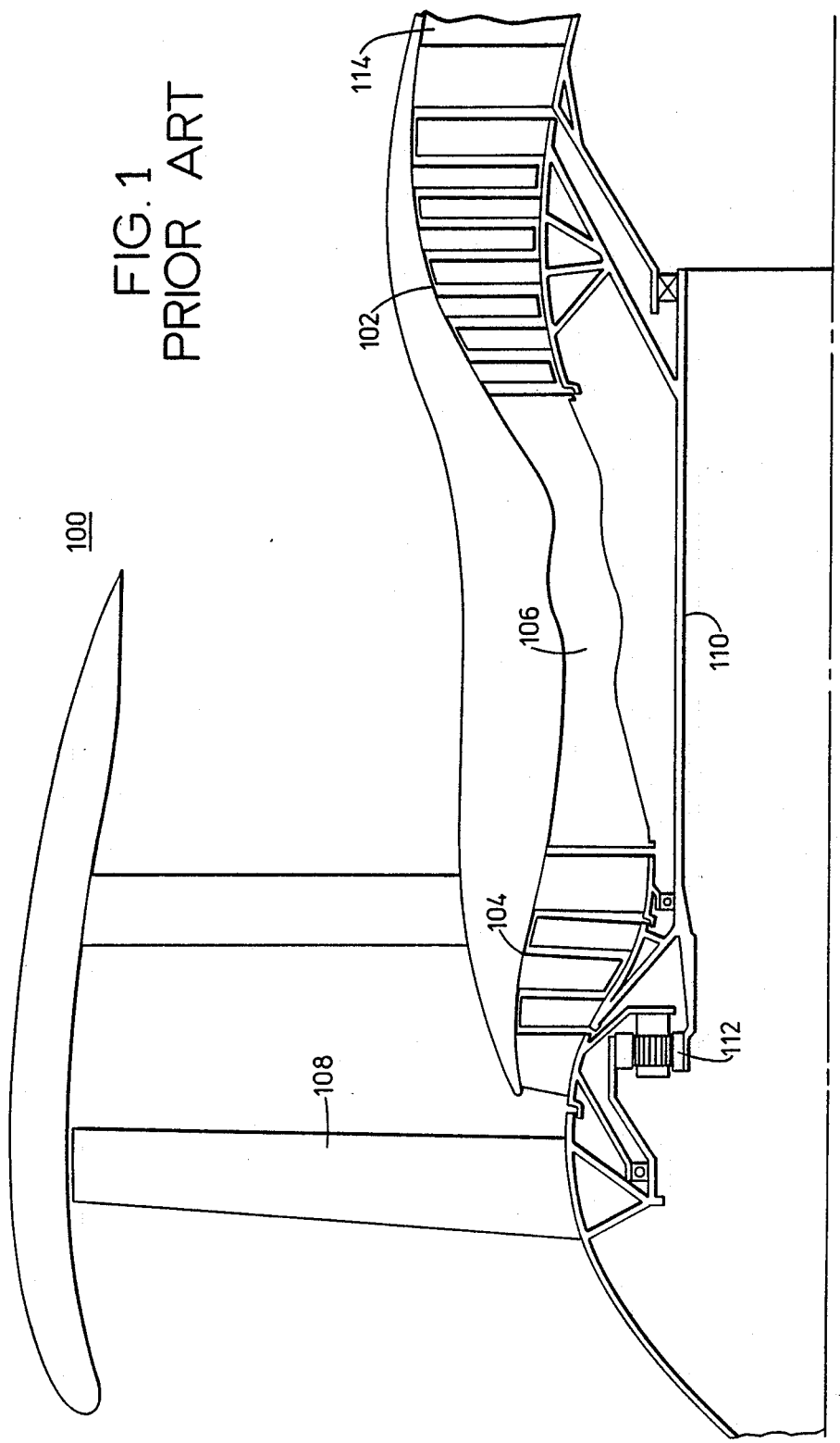
FIG. 1 schematically illustrates a conventional high bypass ratio turbofan engine wherein all of the shaft horsepower delivered to the fan is transmitted through a reduction gear.

The present invention, as illustrated in the preferred embodiment of FIG. 2, provides several advantages over the conventional or prior art arrangement illustrated in FIG. 1. First, first turbine blades 22 may be designed to rotate at a high speed to improve the efficiency of low pressure turbine 20, and also to drive booster compressor 14 at the same high rotational speed thereby resulting in better efficiency for booster compressor 14. Second, fewer stages are required in booster compressor 14 to provide the same output work, and icing problems associated with booster compressors driven at a lower rotational speed may be substantially eliminated. Third, for a given turbine stress limit in the turbine blades of low pressure turbine 20, more work can be extracted since the relative speeds between successive rows of blades and counterrotating blades may be designed to be higher than prior art fan drive turbines (due to the counter rotating elements). Fourth, since reduction gear 42 transmits only a portion of the fan horsepower, the weight and size of reduction gear 42 and the oil cooling system may be reduced. Finally, for the same turbine blade stress limit fewer stages are necessary in low pressure turbine 20 to extract the same shaft horsepower as the prior art low pressure turbine configuration.

With the present invention as illustrated in FIG. 2, a range of speeds and power splits between inner and outer shafts 36 and 38 may be used, by way of example and not limitation, typical power split and operating speeds for shafts 36 and 38 may be as follows wherein: $S_1$=rotational speed in R.P.M. of shaft 36; $S_2$=rotational speed in R.P.M. of shaft 38; $T_1$=torque of shaft 36; $T_2$=torque of shaft 38; and HP=horsepower of respective shafts 36 and 38 when designated with subscripts 1 and 2, respectively.

Example

| | | |
|---|---|---|
| $S_1$ | = | 2000 |
| $S_2$ | = | 5000 |
| $(S_1 + S_2)^2/(S_2)$ | = | 49/25 |
| $(S_2/S_1)^2$ | = | 6.25 |
| $T_2/T_1$ | = | 1.0 |
| $HP_2/HP_1$ | = | 2.5 |
| Booster Compressor HP | = | 20% of total HP |
| $S_1$HP/Total HP | = | 28.6% |
| $S_1$HP/Fan HP | = | 35.7% |
| Reduction Gear HP/Total HP | = | 51.4% |
| Reduction Gear HP/Fan HP | = | 64.3% |

In the above example, assuming that shaft 110 in the engine of FIG. 1 rotates at speed $S_2$, for the same change in enthalpy across counterrotating turbine 20 and across turbine 102, the required number of turbine stages for counterrotating turbine 20 may be about one-half, i.e., 49/25, as many as required for the low pressure turbine 102 of the prior art engine configuration since the work output per stage is directly related to the ratio of the squares of the respective shaft speeds.

Furthermore, the required number of stages of booster compressor 14 can be lower with the configuration of the engine incorporating the teachings of the present invention, as compared to the prior art turbofan engine 100 illustrated in FIG. 1. The booster compressor rotating at the same high speed as first turbine blades 22 rather than at the more conventional fan speed or RPM the results in an increase in work output per stage.

Finally, the size, weight, and oil cooler capacity of reduction gear 42 in the engine incorporating the teachings of the present invention is only approximately 64.3% of the required reduction gear and oil cooler capacity of the prior art engine 100 illustrated in FIG. 1 since reduction gear 42 only transmits a portion of the total fan horsepower.

In the above example, an arbitrary rotational speed ratio between shaft 38 and shaft 36 was chosen as 2.5:1. The exact ratio of shaft RPMs may be varied to attain a favorable compromise between the cost and weight of counterrotating turbine 20 and the cost and weight of booster compressor 14. For instance, a ratio of 2.0:1 between the rotational speeds of shaft 38 and shaft 36 would result in a larger counterrotating turbine 20 and booster compressor 14, but a less heavy and smaller reduction gear 42. The optimum ratio between the rotational speeds of shafts 36 and 38 may be chosen for each application within the operational envelope of a particular engine.

Additional advantages and modifications will readily occur to those skilled in the art. Therefore, the invention in its broader aspects is not limited to the specific details, representatives devices, and illustrative examples shown and described. Accordingly, departures may be made from such details without departing from the spirit or scope of the general inventive concept as defined by the appended claims and their equivalents.

WHAT IS CLAIMED IS:

1. A high bypass ratio turbofan engine, comprising:
 a fan section;
 a booster compressor disposed aft of said fan section relative to the flow of combustion gases through the engine;
 a core section disposed aft of said booster compressor;
 turbine means, disposed aft of said core section, for driving said fan section and said booster compressor, said turbine means comprising a counterrotating turbine having at least one set of rotatable first turbine blades and at least one set of oppositely rotatable counterrotating turbine blades;
 outer shaft means for coupling said first turbine blades to said booster compressor;
 inner shaft means for coupling said counterrotating turbine blades to said fan section; and
 reduction gear means for coupling said outer shaft means to said fan section and for reducing the rotational speed thereof to match the rotational speed and direction of said fan section thereby splitting the usable work of said first turbine blades between said fan section and said booster compressor.

2. The engine of claim 1, wherein said first turbine blades are effective to operate at a higher rotational speed than said counterrotating turbine blades.

3. The engine of claim 1, wherein said inner and outer shaft means comprise inner and outer concentric shafts, respectively, arranged as a twin spool, said inner shaft extending directly between said counterrotating turbine blades and said fan section to drive said fan section.

4. The engine of claim 3, wherein said turbine blades are arranged in axially spaced inner blade rows and extend radially outward from a rotatable inner drum, said inner drum being fixedly connected to said outer shaft, and said counterrotating turbine blades are arranged in axially spaced outer blade rows and extend radially inward from a rotatable outer drum disposed about said inner drum, said outer drum being fixedly connected to said inner shaft.

5. The engine of claim 4, wherein said reduction gear means includes a reduction gear having an input shaft connected to said outer shaft and an output shaft connected to said fan section, said reduction gear including means for reversing the direction of rotation of said outer shaft such that the direction of rotation of said output shaft matches the direction of rotation of said inner shaft.

* * * * *